(12) United States Patent
Francis et al.

(10) Patent No.: US 6,705,045 B1
(45) Date of Patent: Mar. 16, 2004

(54) METHODS FOR PRUNING THE ROOTS OF TREE SEEDLINGS

(75) Inventors: Bruce Francis, Aiken, SC (US); William C. Carlson, Olympia, WA (US)

(73) Assignee: Weyerhaeuser Company, Federal Way, WA (US)

( * ) Notice: Subject to any disclaimer, the term of this patent is extended or adjusted under 35 U.S.C. 154(b) by 0 days.

(21) Appl. No.: 10/340,271

(22) Filed: Jan. 10, 2003

(51) Int. Cl.[7] .............................. A01C 1/00; A01H 5/06
(52) U.S. Cl. ................................................... 47/58.1 S
(58) Field of Search ....................... 47/58.1 SE, 58.1 R (56) References Cited

U.S. PATENT DOCUMENTS

| | | | | |
|---|---|---|---|---|
| RE32,808 E | * | 12/1988 | Wingerden | 47/85 |
| 6,138,769 A | * | 10/2000 | Breyer | 172/380 |
| 6,453,610 B2 | * | 9/2002 | Tonkin et al. | 47/66.7 |

OTHER PUBLICATIONS

Dierauf, T.A., and H.L. Olinger, "A Study of Undercutting, Lateral Root Pruning and Top Clipping in Loblolly Pine Nursery Beds," *Virginia Division of Forestry Occasional Report 58*, 1982, 6pp.

Hatchell, G.E., and H.D. Muse, "Nursery Cultural Practices and Morphological Attributes of Longleaf Pine Bare–Root Stock as Indicators of Early Field Performance," *USDA Forest Services Res. Pap. SE 277*, 1990, 34pp.

Barden, C.J., and T.W. Bowersox, "The Effect of Root Pruning Treatments on Red Oak Seedling Root Growth Capacity," *Proc. Seventh Central Hardwood Forest Conf.*, Carbondale, Illinois, Mar. 5–8, 1989, pp. 115–119.

Chauhan, S.K., et al., "Stimulation of New Roots Through Root Culturing—a Review," *Agric. Rev.* 15(2):99–108, 1994.

Coker, A., "Nitrogen Status of *Pinus Radiata* Seedlings After Undercutting: Changes in Total, Soluble, and Insoluble Nitrogen," *New Zealand J. Forestry Sci.* 14(3):277–88, 1984.

Eis, S., "Lateral Root Pruning—A Promising Forest Nursery Practice," *The Forestry Chronicle*, Oct. 1968, pp. 12–13.

Gilman, E.F., and T.H. Yeager, "Rootlinitiation in Root–Pruned Hardwoods," *HortScience* 23(4):775, 1988.

Gingerich, R.E., and H.G. Hertel, "The Effect of Horizontal and Vertical Root Pruning on 2–0 Austrian Pine (*Pinus nigra* Arnold)," *U.S. Forest Service Tree Planters' Notes No. 52*, 1962, pp. 1–6.

Janouch, K.L., "Effect of Spacing And Root Pruning on the Development of Transplants," *J. Forestry* 25:62–67, 1927.

Nebgen, R.J., and J.F. Meyer, "Seed Bed Density, Undercutting, and Lateral Root Pruning Effects on Loblolly Seedling Morphology, Field Survival, and Growth," *Proc. Int'l Symp. on Nursery Management Practices for the Southern Pine*, Montgomery, Alabama, Aug. 4–9, 1985, pp. 136–147.

Racey, J.E., and G.D. Racey, "Undercutting and Root Wrenching of Tree Seedlings: an Annotated Bibliography," *Forest Research Report No. 121*, Ontario Ministry of Natural Resources, 1988, 70 pp.

Venator, C.R., "Effect of Lateral Root Pruning On Development of Nursery–Grown Longleaf Pine Seedlings," *Tree Planters' Notes* 88:17–19, Spring 1983.

* cited by examiner

*Primary Examiner*—Charles T. Jordan
*Assistant Examiner*—Susan C. Alimenti
(74) *Attorney, Agent, or Firm*—Christensen O'Connor Johnson Kindness PLLC (57) ABSTRACT

The present invention provides methods for pruning the roots of tree seedlings. The methods of the invention include: (a) a first root pruning step wherein the roots of a majority of members of a population of tree seedlings are laterally pruned; (b) a second root pruning step, occurring after the first root pruning step, wherein the roots of the majority of members of the population of tree seedlings are laterally pruned; wherein: (i) the population of tree seedlings is arranged as at least two adjacent pairs of rows of seedlings; and (ii) the roots of the majority of the seedlings are pruned shorter during the first pruning step than during the second pruning step.

14 Claims, 6 Drawing Sheets

METHODS FOR PRUNING THE ROOTS OF TREE SEEDLINGS

FIELD OF THE INVENTION

The present invention relates to the cultivation of trees, such as coniferous trees, and to methods of pruning the roots of tree seedlings.

BACKGROUND OF THE INVENTION

The demand for trees, such as coniferous trees, to provide lumber for making wood products continues to increase. There is therefore a need for methods that improve the growth rate of commercially desirable trees, so that the time from planting to harvest of the tree is reduced. The present inventors have discovered methods of pruning tree seedling roots that stimulate an unexpectedly high level of root growth. Enhanced root growth also promotes growth of the whole seedling, thereby improving the efficiency of commercial tree culture.

SUMMARY OF THE INVENTION

In accordance with the foregoing, in one aspect the present invention provides methods for pruning the roots of tree seedlings. The methods of this aspect of the invention include: (a) a first root pruning step wherein the roots of a majority of members of a population of tree seedlings are laterally pruned; and (b) a second root pruning step, that occurs after the first root pruning step, wherein the roots of the majority of members of the population of tree seedlings are again laterally pruned. In the practice of the methods of this aspect of the invention, the population of tree seedlings is arranged as at least two adjacent pairs of rows (hereinafter referred to as "row pairs") of seedlings, and the roots of the majority of the seedlings are pruned shorter during the first pruning step than during the second pruning step. In some embodiments of the invention, the population of tree seedlings is arranged as six adjacent row pairs of seedlings. In some embodiment of the methods of the invention, a multiplicity of Coulter discs (hereinafter referred to as Coulters) are used to prune the seedling roots. Typically the second root pruning steps takes place within six months of the first root pruning step. For example, the first root pruning step can occur in July and the second root pruning step can occur in December of the same year.

In one embodiment, the present invention provides methods for pruning the roots of a population of tree seedlings wherein: (a) the population of tree seedlings comprises a first row pair, a second row pair, a third row pair, a fourth row pair, a fifth row pair, and a sixth row pair; (b) a first adjacent area is adjacent to the first row pair, and external to the population of tree seedlings; (c) a second adjacent area is adjacent to the sixth row pair, and external to the population of tree seedlings; (d) a first inter-row space is defined by the first row pair and the second row pair, a second inter-row space is defined by the second row pair and the third row pair, a third inter-row space is defined by the third row pair and the fourth row pair, a fourth inter-row space is defined by the fourth row pair and the fifth row pair, and a fifth inter-row space is defined by the fifth row pair and the sixth row pair; (e) the first pruning step utilizes a first Coulter, a second Coulter, a third Coulter, a fourth Coulter, a fifth Coulter, a sixth Coulter, a seventh Coulter, an eighth Coulter, and a ninth Coulter, wherein the first Coulter prunes roots in the first adjacent area, the second Coulter prunes roots in the first inter-row space, the third and fourth Coulters prune roots in the second inter-row space, the fifth Coulter prunes roots in the third inter-row space, the sixth and seventh Coulters prune roots in the fourth inter-row space, the eighth Coulter prunes roots in the fifth inter-row space, and the ninth Coulter prunes roots in the second adjacent area; and (f) the second pruning step utilizes a tenth Coulter, an eleventh Coulter, a twelfth Coulter, and a thirteenth Coulter, wherein the tenth Coulter prunes roots in the first adjacent area, the eleventh Coulter prunes roots in the second inter-row space, the twelfth Coulter prunes roots in the fourth inter-row space, and the thirteenth Coulter prunes roots in the second adjacent area.

The methods of the invention promote tree seedling root growth, thereby promoting the growth and development of the seedlings. The methods of the invention are useful in any situation in which it is desired to prune the roots of tree seedlings. For example, the methods of the invention are useful for pruning the roots of coniferous tree seedlings, thereby promoting the growth of a fibrous root system which, in turn, promotes the survival and growth of the whole seedling upon transplantation or outplanting to a new growth environment.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

In one aspect, the present invention provides methods for pruning the roots of tree seedlings. The methods of this aspect of the invention include: (a) a first root pruning step wherein the roots of a majority of members of a population of tree seedlings are laterally pruned; and (b) a second root pruning step, that occurs after the first root pruning step, wherein the roots of the majority of members of the population of tree seedlings are laterally pruned. In the practice of the methods of this aspect of the invention, the population of tree seedlings is arranged as at least two adjacent row pairs of seedlings, and the roots of a majority of the seedlings are pruned shorter during the first pruning step than during the second pruning step.

The term "laterally pruned," and grammatical equivalents thereof, refers to pruning the roots that grow outward from the vertical axis of a tree seedling. For example, when seedlings are arranged in adjacent row pairs, the seedling roots can be laterally pruned between the row pairs.

The term "majority" when used in the phrases, "majority of members of a population of tree seedlings," or "majority of members of the population of tree seedlings," or "majority of the seedlings," means between 50% and 100% of the tree seedlings (e.g., more than 60%, more than 70%, more than 80%, more than 90%, more than 95%, or more than 99%.

Some embodiments of the invention include at least one additional pruning step (e.g., one, two, three, four or five root pruning steps) between the first and the second root pruning steps. In each of these additional root pruning steps the roots of a majority of the seedlings are pruned shorter than in the second pruning step (i.e., the roots of each individual seedling within the majority of seedlings are pruned closer to the vertical axis of the seedling during the additional pruning step than during the second pruning step). In each of these additional root pruning steps the roots of a majority of the seedlings may be pruned shorter or wider compared to the first pruning step. For example, in some embodiments the roots are pruned wider in the additional root pruning step compared to the first root pruning step (i.e., the roots of each individual seedling within the majority of seedlings are pruned further from the vertical axis of the seedling during the additional pruning step than during the first pruning step).

Other root pruning techniques (e.g., root wrenching, root undercutting) may be utilized in the practice of the present invention. A representative method of root wrenching involves sliding a metal blade under the bed of seedlings, and moving the blade through the soil. The blade is not horizontal, but is tipped forward slightly and so creates shock waves in the soil as the blade moves. The shock waves damage at least some of the seedling roots. The roots of the seedlings can be wrenched on one or more occasions (e.g., before and/or after any of the root pruning steps).

The methods of the invention are applicable to any tree species, such as coniferous tree species including firs and pines. Representative examples of tree species that can be treated in accordance with the methods of the invention include loblolly pine, shortleaf pine, slash pine, radiata pine, ponderosa pine and douglas fir.

Typically, in the practice of the invention tree seedlings are between four months old and six months old when they are pruned in the first root pruning step. The roots must have grown sufficiently long to be pruned by whatever pruning means is utilized. The second root pruning step typically occurs within six months after the first root pruning step, but may occur later than six months after the first root pruning step.

Figure 1:
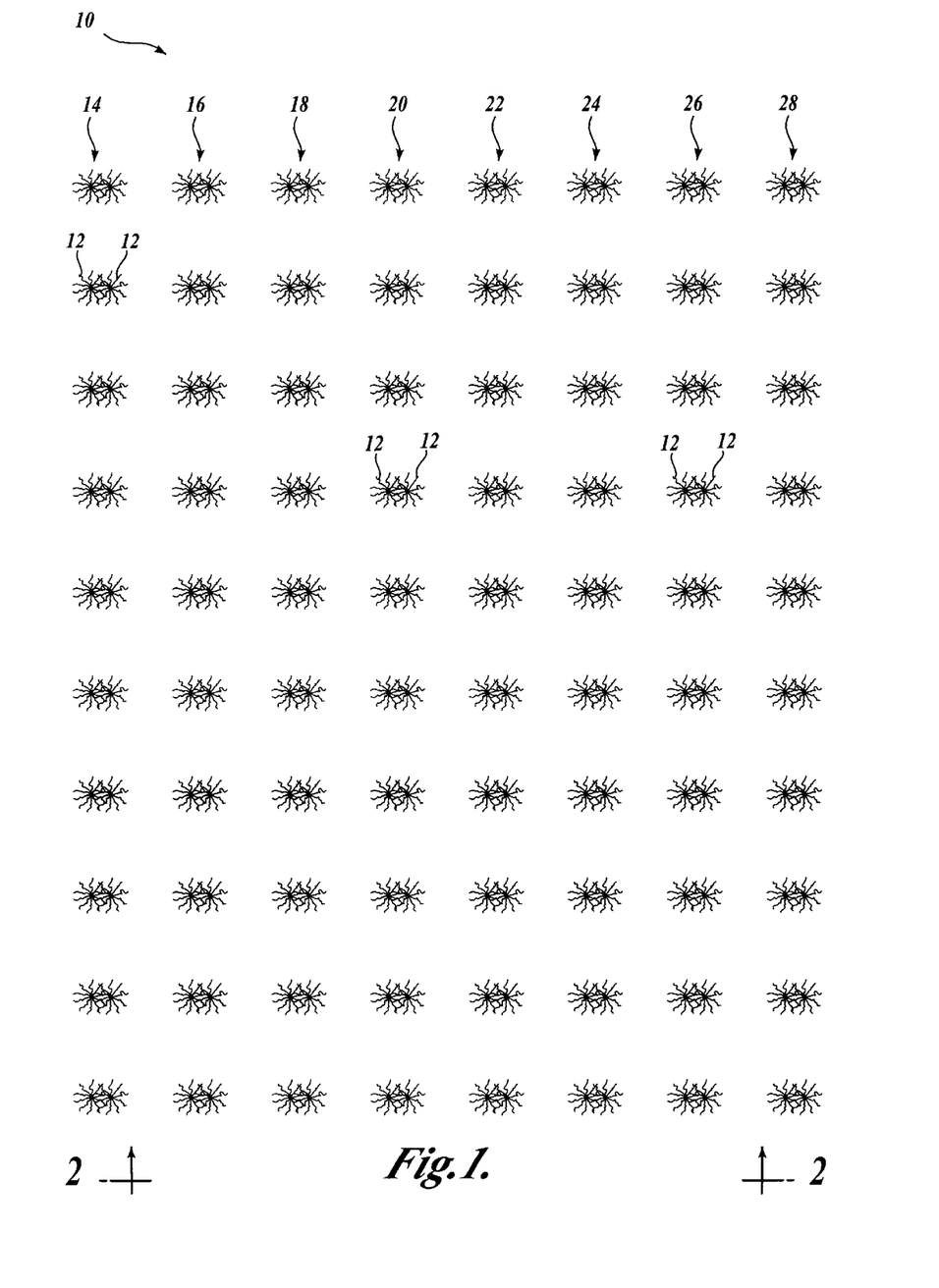
FIG. 1 shows an aerial view of a population of tree seedlings arranged as eight adjacent pairs rows (referred to as row pairs) of seedlings.
Figure 2:
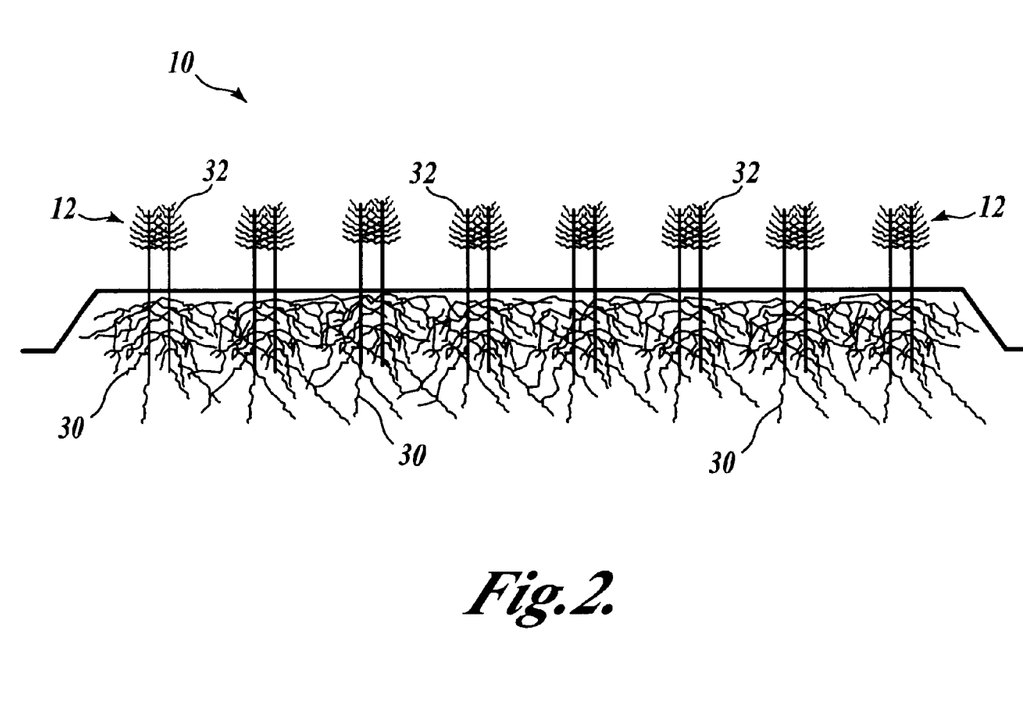
FIG. 2 shows a cross-sectional end view of the population of tree seedlings shown in FIG. 1.

The population of tree seedlings is arranged as at least two adjacent row pairs of seedlings. An advantage to arranging the seedlings in adjacent row pairs is that the area between the row pairs is readily accessible for laterally pruning the seedling roots. Thus, for example, FIG. 1 shows an aerial view of a population of tree seedlings 10. The arrangement of individual tree seedlings 12 shown in FIG. 1 is an art-recognized arrangement that is used by foresters to commercially cultivate coniferous tree species, such as douglas-firs, true firs and pines. Individual seedlings 12 are arranged in rows, which, in turn, are arranged as eight adjacent row pairs which are numbered 14, 16, 18, 20, 22, 24, 26 and 28. In the exemplary embodiment shown in FIG. 1, each row pair 14, 16, 18, 20, 22, 24, 26 and 28 contains twenty seedlings 12; although, in operation, each row pair 14, 16, 18, 20, 22, 24, 26 and 28 may contain more, or less, than twenty seedlings 12. Exemplary seedling densities are from 30 to 120 seedlings per lineal bed foot (a lineal bed foot (LBF) is 4 ft² of bed surface space). Seedling densities for some tree species, such as douglas-fir, can be as high as 200 to 300 seedlings per lineal bed foot. FIG. 2 shows an end view of population of tree seedlings 10 shown in FIG. 1, with the soil cut away. Thus, FIG. 2 shows seedling roots 30 and seedling aerial portions 32.

Figure 3:
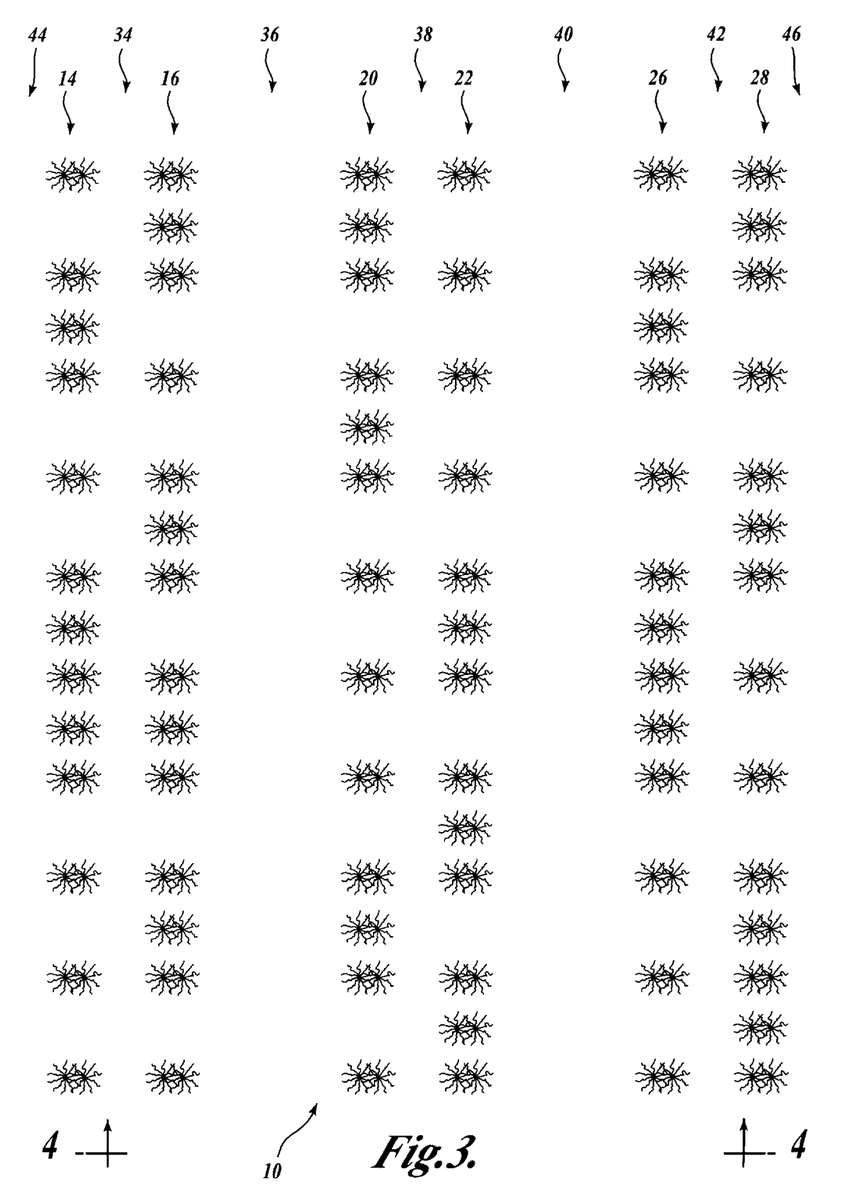
FIG. 3 shows an aerial view of a population of tree seedlings arranged as six adjacent row pairs.
Figure 4:
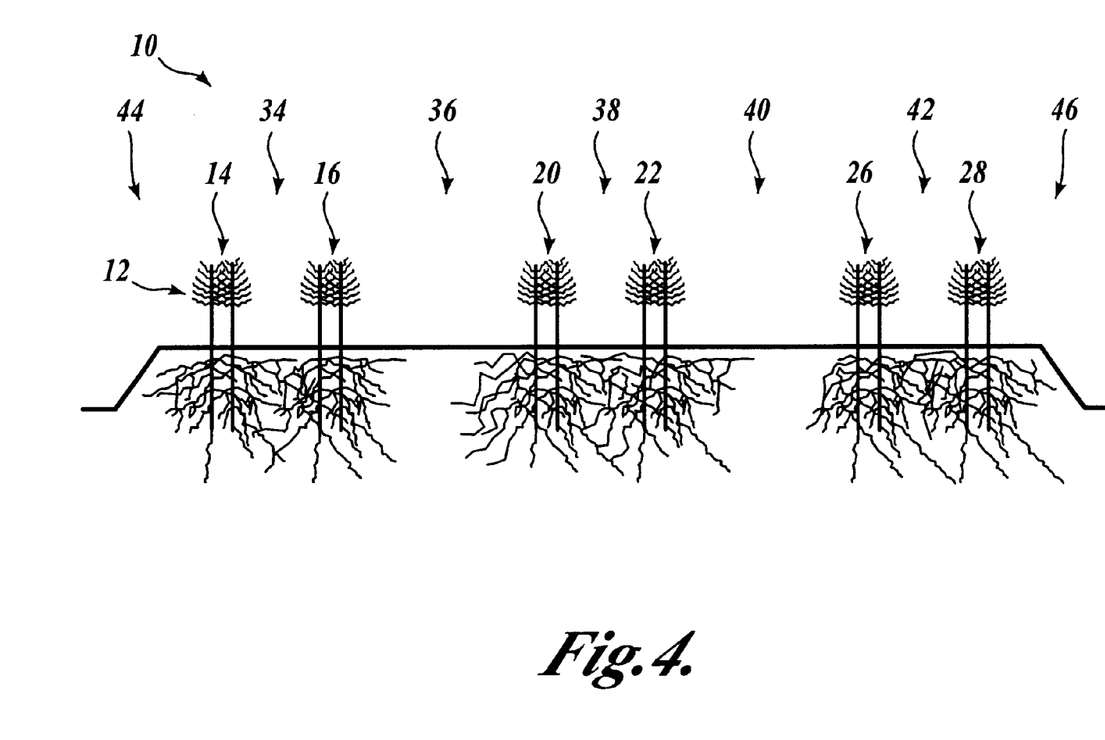
FIG. 4 shows a cross-sectional end view of the population of tree seedlings shown in FIG. 3.

As shown in FIGS. 3 and 4, in one embodiment of the invention, only row pairs 14, 16, 20, 22, 26 and 28 are present. Row pair 14 is hereinafter referred to as first row pair 14; row pair 16 is hereinafter referred to as second row pair 16; row pair 20 is hereinafter referred to as third row pair 20; row pair 22 is hereinafter referred to as fourth row pair 22; row pair 26 is hereinafter referred to as fifth row pair 26; and row pair 28 is hereinafter referred to as sixth row pair 28.

Seedlings 12 that would otherwise be present in row pairs 18 and 24 are disposed in first row pair 14, second row pair 16, third row pair 20, fourth row pair 22, fifth row pair 26 and sixth row pair 28, thereby leaving gaps where row pairs 18 and 24 would otherwise be located. Typically, although not necessarily, the seed from row pairs 18 and 24 are distributed evenly among first row pair 14, second row pair 16, third row pair 20, fourth row pair 22, fifth row pair 26 and sixth row pair 28.

Thus, in the embodiment shown in FIGS. 3 and 4, first row pair 14 and second row pair 16 define first inter-row space 34; second row pair 16 and third row pair 20 define second inter-row space 36; third row pair 20 and fourth row pair 22 define third inter-row space 38; fourth row pair 22 and fifth row pair 26 define fourth inter-row space 40; and fifth row pair 26; and sixth row pair 28 define fifth inter-row space 42. The area adjacent to first row pair 14, and external to population of tree seedlings 10, is first adjacent area 44; and the area adjacent to sixth row pair 28, and external to population of tree seedlings 10, is second adjacent area 46.

Figure 5:
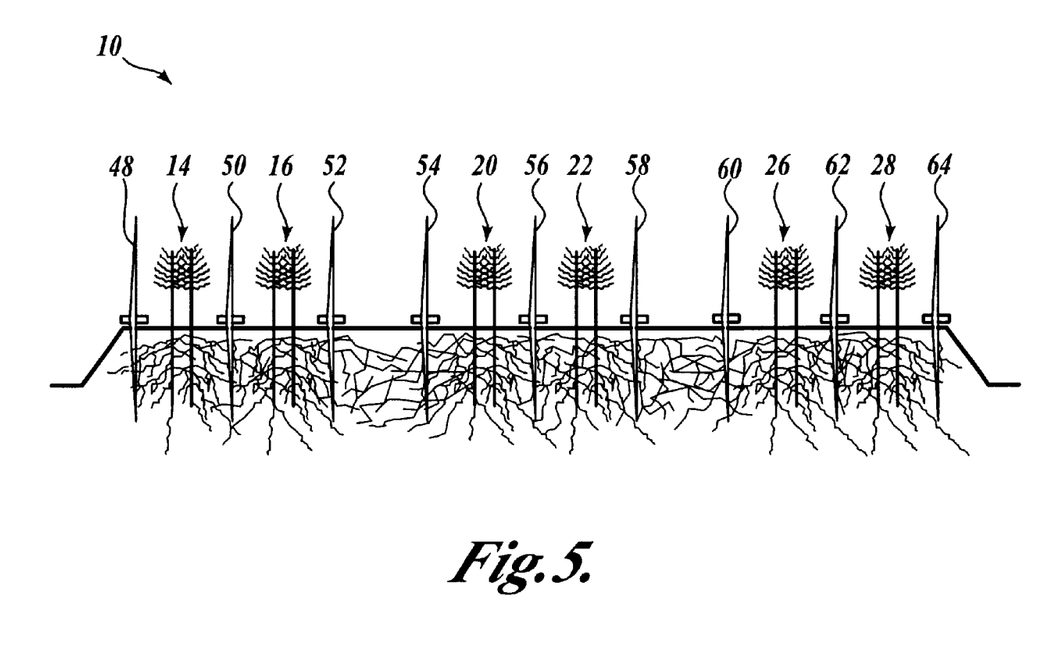
FIG. 5 shows the location of the Coulters used in the first pruning step of a representative embodiment of a method of the invention to trim the roots of a population of seedlings arranged as shown in FIG. 4.

In the practice of the invention, growth of roots 30 of tree seedlings 12 is stimulated by laterally pruning roots 30 on two separate occasions. Roots 30 are pruned shorter during the first root pruning step than during the second root pruning step. For example, as shown in FIG. 5, in an embodiment of the invention utilizing the arrangement of seedlings 12 shown in FIGS. 3 and 4, the first lateral pruning step utilizes a set of nine, spaced, circular, blades, called Coulter discs (that are typically attached to a motorized frame that pushes them through the soil), that are identified in FIG. 5 as first Coulter 48, second Coulter 50, third Coulter 52, fourth Coulter 54, fifth Coulter 56, sixth Coulter 58, seventh Coulter 60, eighth Coulter 62, and ninth Coulter 64. Coulters 48, 50, 52, 54, 56, 58, 60, 62, 64 are rolled through the soil in inter-row spaces 34, 36, 38, 40, and 42, and through the soil in adjacent areas 44 and 46, so that the circumference of each Coulter cuts roots 30 growing outward from seedlings 12.

Figure 6:
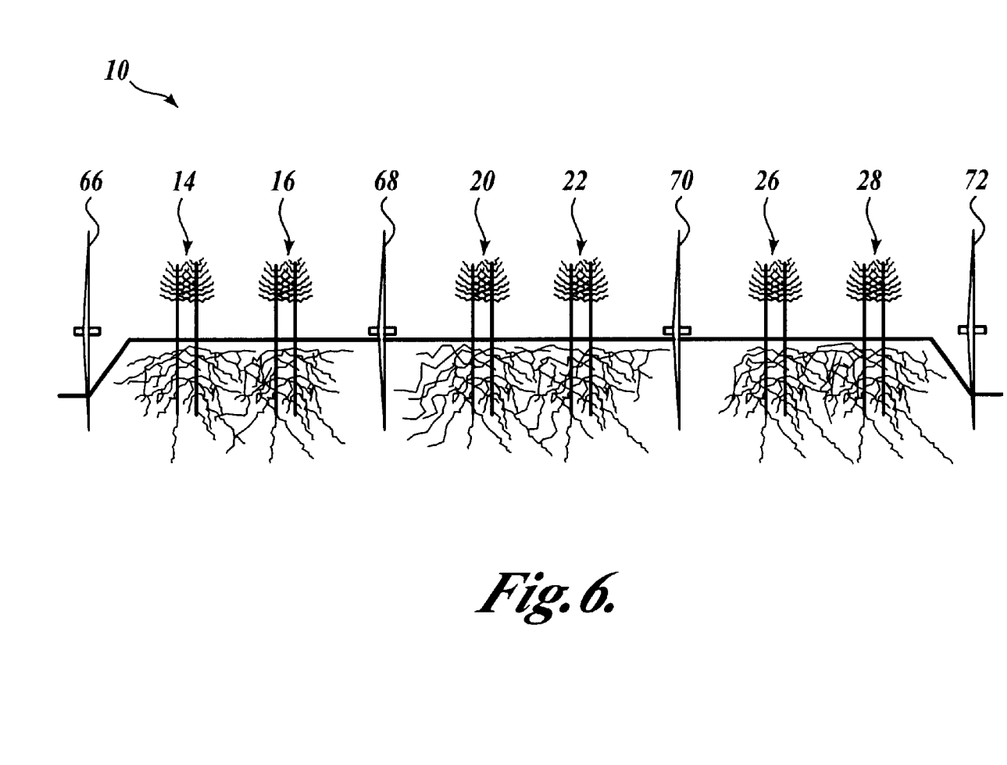
FIG. 6 shows the location of the Coulters used in the second pruning step of a representative embodiment of a method of the invention to trim the roots of a population of seedlings arranged as shown in FIG. 4.

As shown in FIG. 6, in the embodiment of the invention utilizing the arrangement of seedlings 12 shown in FIGS. 3 and 4, the second lateral pruning step utilizes a set of four Coulters identified as tenth Coulter 66, eleventh Coulter 68, twelfth Coulter 70 and thirteenth Coulter 72, that are rolled through the soil in second inter-row space 36 and fourth inter-row space 40, and through adjacent regions 44 and 46. Thus, fewer Coulters are used to accomplish the second lateral pruning step than the first lateral pruning step, and Coulters 66, 68, 70 and 72 are spaced further from seedlings 12 than are Coulters 48, 50, 52, 54, 56, 58, 60, 62, 64. Consequently, roots 30 of seedlings 12 are pruned shorter during the first pruning step than during the second pruning step. It will be understood that tenth Coulter 66, eleventh Coulter 68, twelfth Coulter 70 and thirteenth Coulter 72 can be an appropriately spaced subset of first Coulter 48, second Coulter 50, third Coulter 52, fourth Coulter 54, fifth Coulter 56, sixth Coulter 58, seventh Coulter 60, eighth Coulter 62, and ninth Coulter 64. Although Coulters having a smooth circumference are shown in the figures, other types of Coulters are also useful, such as Coulters having a serrated circumference. Examples of useful Coulters are those sold by Summit Equipment, New Zealand.

The following examples merely illustrate the best mode now contemplated for practicing the invention, but should not be construed to limit the invention.

EXAMPLE 1

This Example describes a representative method of the invention for pruning the roots of loblolly pine seedlings.

Three row pairs of loblolly pine seeds are each planted in a nursery bed in the pattern shown in FIGS. 3 and 4. The width of the nursery bed is typically about four feet. The length of the nursery bed is typically in the range of from one hundred feet to 1600 feet. Typically, eight seeds are planted, per foot, in each row within each row pair. The seed are sown in Spring and thereafter germinate to yield three row pairs of seedlings. In July of the year in which the seed are planted, the seedling roots are laterally pruned using nine Coulter discs that are rolled through the soil on either side of each row pair of seedlings. The arrangement of the nine Coulter discs is as shown in FIG. 5.

The seedling roots are again laterally pruned, usually sometime after October of the year in which the seedlings were planted, although this pruning can occur earlier (e.g., in September of the year in which the seedlings were planted), or later (e.g., in January of the following year). This pruning uses only four Coulter discs, which are spaced further from the seedlings than in the root pruning step in July. The arrangement of the four Coulter discs is as shown in FIG. 6. Typically, in January of the year following the year in which the seed are planted, the seedlings are removed from the nursery beds, and may be stored or transplanted to a growth site, such as a tree plantation. The seedlings may be removed from the nursery beds anytime from November of the year in which they are planted to March of the second year after the year in which they are planted.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of pruning the roots of tree seedlings, the method comprising:
    (a) a first root pruning step wherein the roots of a majority of members of a population of tree seedlings are laterally pruned;
    (b) a second root pruning step, that occurs after the first root pruning step, wherein the roots of the majority of members of the population of tree seedlings are laterally pruned;
    wherein:
        (i) the population of tree seedlings is arranged as at least two adjacent row pairs of seedlings; and
        (ii) the roots of the majority of the seedlings are pruned shorter during the first pruning step than during the second pruning step.

2. The method of claim 1, wherein the population of tree seedlings comprises six adjacent row pairs of seedlings.

3. The method of claim 1, wherein the roots are pruned between the adjacent row pairs of seedlings.

4. The method of claim 1, wherein the second root pruning step occurs within six months of the first root pruning step.

5. The method of claim 4, wherein the first root pruning step occurs in July and the second root pruning step occurs in December.

6. The method of claim 1, wherein pruning is accomplished using a multiplicity of Coulters.

7. The method of claim 6 wherein fewer Coulters are used in the second root pruning step than in the first root pruning step.

8. The method of claim 1 wherein:
    (a) the population of tree seedlings is arranged as six adjacent row pairs of seedlings; and
    (b) nine Coulters are used to prune the roots in the first root pruning step, and four Coulters are used to prune the roots in the second root pruning step.

9. The method of claim 1 wherein the tree seedlings are between four and six months old when they are pruned in the first root pruning step.

10. The method of claim 1 wherein:
    (a) the population of tree seedlings comprises a first row pair, a second row pair, a third row pair, a fourth row pair, a fifth row pair, and a sixth row pair;
    (b) a first adjacent area is adjacent to the first row pair, and external to the population of tree seedlings;
    (c) a second adjacent area is adjacent to the sixth row pair, and external to the population of tree seedlings;
    (d) a first inter-row space is defined by the first row pair and the second row pair, a second inter-row space is defined by the second row pair and the third row pair, a third inter-row space is defined by the third row pair and the fourth row pair, a fourth inter-row space is defined by the fourth row pair and the fifth row pair, and a fifth inter-row space is defined by the fifth row pair and the sixth row pair;
    (e) the first pruning step utilizes a first Coulter, a second Coulter, a third Coulter, a fourth Coulter, a fifth Coulter, a sixth Coulter, a seventh Coulter, an eighth Coulter, and a ninth Coulter, wherein the first Coulter prunes roots in the first adjacent area, the second Coulter prunes roots in the first inter-row space, the third and fourth Coulters prune roots in the second inter-row space, the fifth Coulter prunes roots in the third inter-row space, the sixth and seventh Coulters prune roots in the fourth inter-row space, the eighth Coulter prunes roots in the fifth inter-row space, and the ninth Coulter prunes roots in the second adjacent area; and
    (f) the second pruning step utilizes a tenth Coulter, an eleventh Coulter, a twelfth Coulter, and a thirteenth Coulter, wherein the tenth Coulter prunes roots in the first adjacent area, the eleventh Coulter prunes roots in the second inter-row space, the twelfth Coulter prunes roots in the fourth inter-row space, and the thirteenth Coulter prunes roots in the second adjacent area.

11. The method of claim 1 further comprising the step of wrenching at least some of the seedlings.

12. The method of claim 1 further comprising the step of wrenching the majority of the seedlings.

13. The method of claim 1 further comprising at least one additional root pruning step between the first pruning step and the second pruning step, wherein the roots are pruned shorter in the at least one additional root pruning step compared to the second pruning step.

14. The method of claim 13 wherein the roots are pruned wider in the additional root pruning step compared to the first root pruning step.

* * * * *